United States Patent [19]

Spies

[11] 4,427,463
[45] Jan. 24, 1984

[54] METHOD OF AND DEVICE FOR CONTROLLING AND COOLING OF A CONTINUOUS ROLLED MEMBER, E.G. A WIRE

[75] Inventor: Klaus Spies, Mülheim, Fed. Rep. of Germany

[73] Assignee: Fried. Krupp Gesellschaft mit Beschränkter Haftung, Essen, Fed. Rep. of Germany

[21] Appl. No.: 389,976

[22] Filed: Jun. 18, 1982

[30] Foreign Application Priority Data

Jun. 27, 1981 [DE] Fed. Rep. of Germany ....... 3125315

[51] Int. Cl.³ .................. C21D 1/54; C21D 11/00
[52] U.S. Cl. .................. 148/129; 266/87; 266/90; 374/183
[58] Field of Search .......... 148/129, 128; 374/183, 374/153, 113, 114, 166; 266/78, 81, 87, 90, 99; 336/30; 219/10.77

[56] References Cited

U.S. PATENT DOCUMENTS 3,604,882  9/1971  Seyfried ................... 219/10.77
3,613,418 10/1971  Nara et al. ................... 266/87

FOREIGN PATENT DOCUMENTS 1452345  4/1974  Fed. Rep. of Germany .

Primary Examiner—Dewayne L. Rutledge
Assistant Examiner—S. Kastler
Attorney, Agent, or Firm—Karl F. Ross; Herbert Dubno

[57] ABSTRACT

The temperature of hot-rolled wire is controlled by passing the wire through a primary coil and a secondary coil continuously while energizing the primary coil with a high frequency alternating current (preferably 100 kHz) so that a temperature-control voltage is induced in the secondary coil. The secondary coil is connected to a comparator receiving a setpoint signal representing the desired temperature and the error signal from the comparator is fed via a temperature controller to the coolant control valve of the cooling stretch.

5 Claims, 2 Drawing Figures

METHOD OF AND DEVICE FOR CONTROLLING AND COOLING OF A CONTINUOUS ROLLED MEMBER, E.G. A WIRE

FIELD OF THE INVENTION

My present invention relates to a method of and to a device for controlling the cooling of a continuous rolled member, especially a hot-rolled wire.

BACKGROUND OF THE INVENTION

It is known, in the rolling of continuous members, e.g. wire, to control the cooling with the aid of temperature measurements utilizing, for example, a pyrometer to measure the rolling wire temperature following the rolling process.

However, the measured value of the temperature is largely a function of the medium between the wire and the pyrometer, e.g. is sensitive to the presence of the cooling water, steam or the like. As a result, the measuring location must be provided downstream of the cooling stretch and hence the measured temperature does not permit precision control of the cooling system.

In order to provide precision control of the cooling temperature, it is necessary to measure the temperature of the wire free from such influences during the cooling operation. However, it has been found that it is impractical or impossible to subdivide a cooling process into a multiplicity of cooling zones with temperature measurement of this type following each zone so as to be effected downstream thereof.

The measurements are also found to be adversely affected by surface impurities on the rolled wire.

Another process for measuring the rolled wire temperature is described in German Pat. No. 1,452,345. In this method the temperature of the wire surface is not measured, but rather the heat content of the wire is determined by measuring the thermal radiation from the wire.

This can be achieved with an electrical resistor which surrounds the wire and serves as a temperature sensor.

The disadvantage of this measurement approach is that the measurement does not always reflect the surface temperature so that excessive cooling might detrimentally affect the surface structure of the wire or insufficient cooling which may not be metallurgically satisfactory can result.

OBJECTS OF THE INVENTION

It is the principal object of the present invention to provide an improved method of cooling hot-rolled wire and of controlling the cooling thereof in response to temperature measurements whereby the disadvantages of earlier systems are obviated.

Another object of this invention is to provide a method of rapidly and accurately determining the temperature of a hot-rolled wire to facilitate the controlled cooling thereof.

Still another object of the invention is to provide a method for controlling the cooling of a rolled wire so that the latter is rapidly brought to a predetermined surface temperature without intervening undercooling.

Yet another object of this invention is to provide an improved device or carrying out the method of this invention.

SUMMARY OF THE INVENTION

These objects and others which will become apparent hereinafter are attained, in accordance with the present invention, in a method in which the wire itself is utilized as the core of a high frequency transformer.

According to this invention, the surface temperature of the wire is measured in a contactless manner by energizing the wire with a primary coil which surrounds the wire as the latter passes continuously through this primary coil.

The energizing element is high frequency alternating current and the wire is surrounded, in addition, by a secondary coil. The voltage induced in this secondary coil is detected and this value (temperature-control signal or actual value) is utilized to control the cooling medium.

In particular, this value can be utilized by comparison with a setpoint value of the temperature, to regulate the rate at which the cooling medium is brought into contact with the wire.

It has been found that measurements of the temperature in this manner are independent of nonmetallic impurities in the wire surface and further that the system is independent of the cooling medium surrounding the wire so that the coils which surround the wire in a contactless manner can be provided directly in the region of the cooling operation and even may be within the path of the coolant.

With this system, for example, the wire can traverse a plurality of cooling structures each of which may be provided with the respective sensor and control circuit so that each cooling zone is optimally controlled.

According to another feature of the invention, the primary coil is energized with an electric current with a frequency of about 100 kHz. At this frequency, as I have found, the voltage which is detected across the secondary coil most accurately represents the actual surface or superficial temperature of the wire with a minimum of contribution from the temperature inwardly of the surface. The contributions of internal temperatures are thus practically negligible.

The invention has been found to be primarily useful for the cooling of steel wire. The coolant which is directed against the rolled wire is so adjusted that the surface is cooled at the maximum possible rate. That does not lead to martensite formation. When martensite formation on the surface of the wire is prevented or hindered, it is possible to exclude martensite formation within the interior of the wire as well since the interior temperature is always higher.

In fact, I have found that it is possible utilizing the new cooling approach of this invention to cool the surface of the entire length of a cooling stretch with such intensity that in comparison with earlier systems the length of the cooling stretch can be reduced significantly.

I have also found it to be highly advantageous to provide the primary coil and the secondary coil so that they are spaced apart in the direction of movement of the wire. The output of the second coil is the actual value signal which is applied to a comparator together with the setpoint signal representing the desired temperature of the wire.

The resulting error signal can be fed to a function generator whose transfer function translates the error signal into controlled responses, i.e. the responses of a valve, thereby regulating the flow of cooling to the cooling stretch.

The high frequency voltage in the primary coil generates eddy currents in the secondary coil, the eddy currents, in turn, giving rise to a voltage in the secondary coil whose proportionality to the ohmic resistance of the rolled wire at the surface will thus provide an indication of the latter structure and hence the temperature thereof.

I have also found it to be highly advantageous to subdivide the primary coil into two partial coils connected in series and disposed fore and aft of the seondary coil. This has been found to minimize the power loss in the region at which the temperature is measured.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
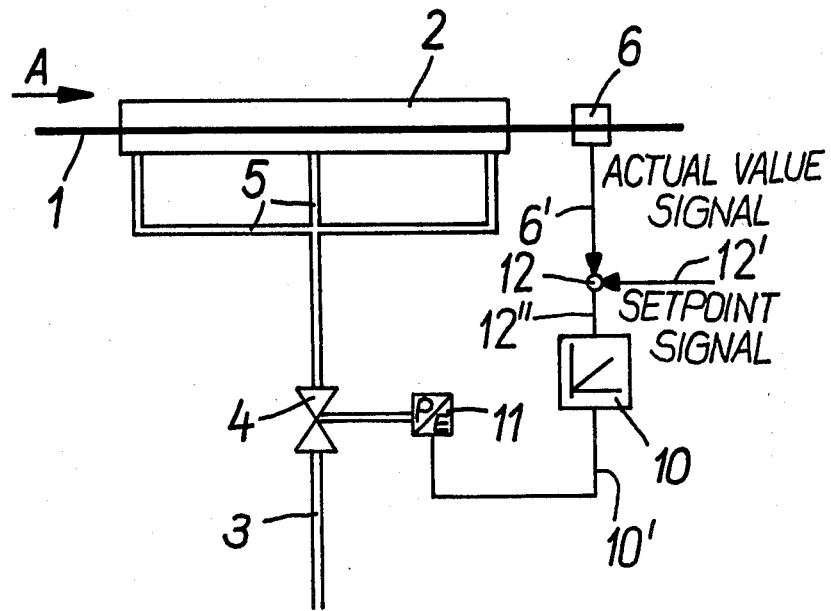
FIG. 1 is a flow diagram illustrating the invention.

The wire 1 is passed in the direction of arrow A from the hot rolling mill line to the cooling stretch 2, here shown to be a single zone although it will generally be understood to be one of a series of such zones collectively forming the cooling stretch.

In the cooling zone, the wire is blanketed with a cooling medium, for example water, which is fed through distributing pipes 5 from a valve 4 into contact with the wire 1.

The valve 4 is an electromagnetic valve and is fed with a water supply pipe 3.

Immediately downstream of the cooling zone, a sensor 6 is provided, the sensor 6 delivering an actual value signal as represented at 6' to a comparator 12 which is also supplied with a setpoint signal as represented at 12'.

Figure 2:
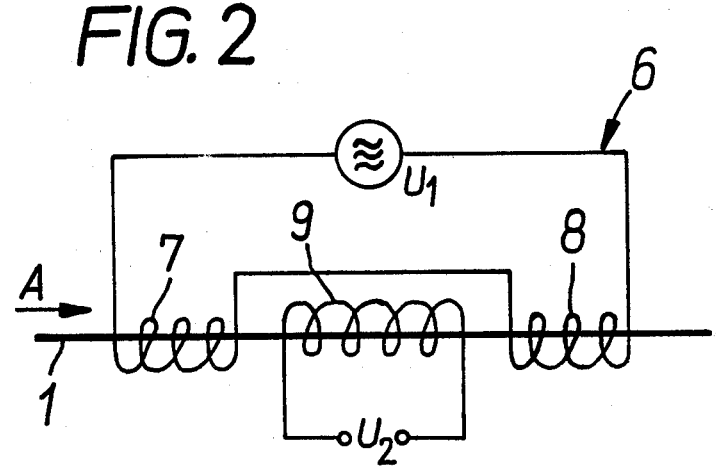
FIG. 2 is a detail circuit diagram of a portion of FIG. 1.

The sensor 6 has been shown in greater detail in FIG. 2. From this figure it will be apparent that the wire 1 passes in a contactless manner through a pair of series connected coil halves 7 and 8 collectively forming the primary coil which is energized by a high frequency voltage source $G_2$. The latter may deliver a frequency of for example 100 kHz. The coil parts 7 and 8 straddle a secondary coil 9 which also surrounds the wire in a contactless manner. The voltage induced in the secondary coil represents the temperature in the surface of the wire and is the signal $U_2$ which is represented by the actual value signal 6' previously described.

Any deviation of the actual value signal from the setpoint signal will result in an error signal at 12" which is fed to the temperature controller 10, i.e. a function generator which transforms the error signal into an output signal 10' representing the degree of actuation of the valve 4 necessary to compensate for the error signal, i.e. required to reduce it to zero. The signal 10' is applied to an electropneumatic transducer 11 which operates the valve 4.

The device described has been found to control the temperature of the wire upon passage through the cooling stretch with a high degree of precision.

I claim:

1. A method of controlling the cooling of a continuously moving rolled wire which comprises the steps of:
    passing said wire continuously through at least one cooling zone in a cooling stretch in which the wire is contacted with a coolant;
    surrounding said wire with a primary coil;
    energizing said primary coil with a high-frequency alternating current;
    inducing in a secondary coil surrounding said wire and adjacent said primary coil an electric current representing the superficial temperature of said wire resulting from the high frequency energization of said wire by said primary coil, thereby generating a temperature control signal at said secondary coil; and
    controlling the flow of coolant to said zone in response to said temperature control signal, said high frequency alternating current applied to said primary coil having a frequency of about 100 kHz.

2. A method of controlling the cooling of a continuously moving rolled steel wire which comprises the steps of:
    passing said wire continuously through at least one cooling zone in a cooling stretch in which the wire is contacted with a coolant;
    surrounding said wire with a primary coil;
    energizing said primary coil with a high-frequency alternating current;
    inducing in a secondary coil surrounding said wire and adjacent said primary coil an electric current representing the superficial temperature of said wire resulting from the high frequency energization of said wire by said primary coil, thereby generating a temperature control signal at said secondary coil;
    controlling the flow of coolant to said zone in response to said temperature control signal; and
    controlling the flow of coolant to said zone in response to said temperature control signal so that the surface of said wire is cooled maximally without martensite formation.

3. A method of controlling the cooling of a continuously moving rolled wire which comprises the steps of:
    passing said wire continuously through at least one cooling zone in a cooling stretch in which the wire is contacted with a coolant;
    surrounding said wire with a primary coil;
    energizing said primary coil with a high-frequency alternating current;
    inducing in a secondary coil surrounding said wire and adjacent said primary coil an electric current representing the superficial temperature of said wire resulting from the high frequency energization of said wire by said primary coil, thereby generating a temperature control signal at said secondary coil; and
    controlling the flow of coolant to said zone in response to said temperature control signal, said wire being passed through two parts of said primary coil straddling said secondary coil.

4. The system for controlling the cooling of a rolled wire, comprising a cooling stretch formed with at least one cooling zone continuously traversed by said wire;
    feed means for supplying a coolant to said zone at a controlled rate;
    a surface temperature detector traversed by said wire, said detector comprising:
    at least one primary coil traversed by said wire;
    means for energizing said primary coil with high frequency alternating current;

a secondary coil adjacent said primary coil and traversed by said wire in a contactless manner, said secondary coil generating a temperature control signal;

means responsive to said temperature control signal for controlling said feed means; and comparator receiving said temperature signal and a setpoint signal representing the desired temperature of said wire and producing an error signal, said feed means including a control valve, a temperature controller being interposed between said comparator and said controller for operating same.

5. The system for controlling the cooling of a rolled wire, comprising a cooling stretch formed with at least one cooling zone continously traversed by said wire; feed means for supplying a coolant to said zone at a control led rate;

a surface temperature detector traversed by said wire, said detector comprising:

at least one primary coil traversed by said wire;

means for energizing said primary coil with high frequency alternating current;

a secondary coil adjacent said primary coil and traversed by said wire in a contactless manner, said secondary coil generating a temperature control signal; and means responsive to said temperature control signal for controlling said feed means, said primary coil consisting of two coil parts straddling said secondary coil and connected in series.

* * * * *